Figure 1:
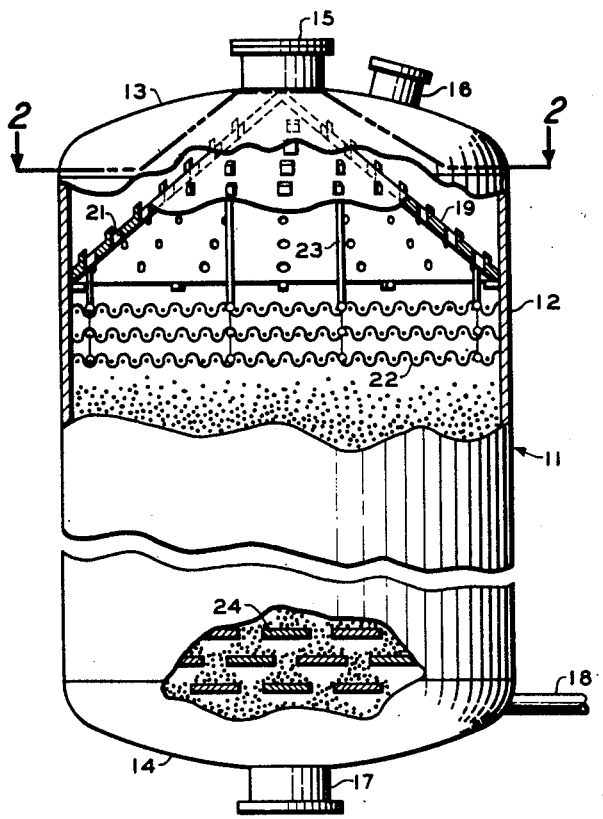

Oct. 13, 1953     R. D. SNOW     2,655,273
METHOD AND APPARATUS FOR EVENLY DISTRIBUTING
SOLID CONTACT MATERIAL
Filed Nov. 7, 1949     4 Sheets-Sheet 1

INVENTOR.
R. D. SNOW
BY Hudson and Young
ATTORNEYS

Oct. 13, 1953   R. D. SNOW   2,655,273
METHOD AND APPARATUS FOR EVENLY DISTRIBUTING
SOLID CONTACT MATERIAL
Filed Nov. 7, 1949   4 Sheets-Sheet 2

INVENTOR.
R. D. SNOW

BY Hudson and Young

ATTORNEYS

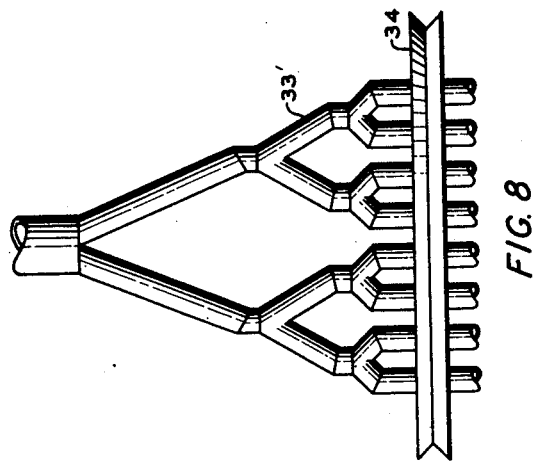
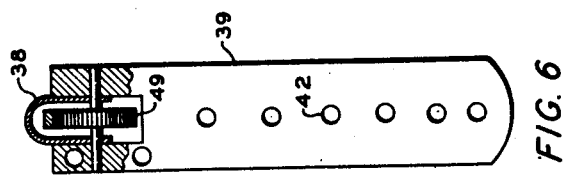
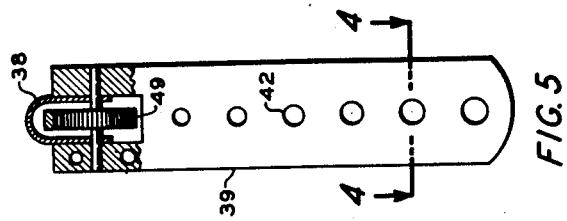
INVENTOR.
R. D. SNOW

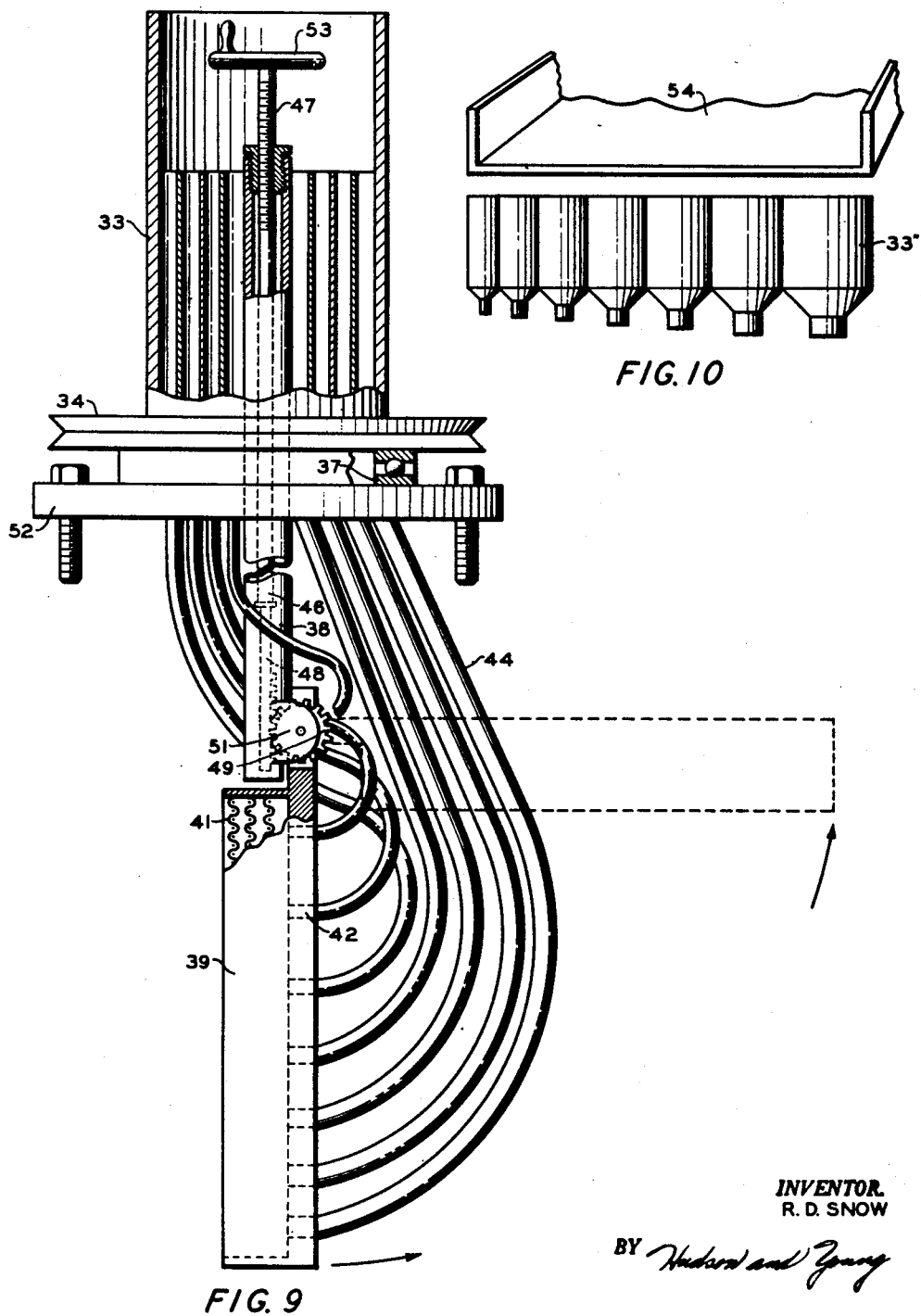

Patented Oct. 13, 1953

2,655,273

UNITED STATES PATENT OFFICE

2,655,273

METHOD AND APPARATUS FOR EVENLY DISTRIBUTING SOLID CONTACT MATERIAL

Robert D. Snow, Bartlesville, Okla., assignor to Phillips Petroleum Company, a corporation of Delaware Application November 7, 1949, Serial No. 125,966

12 Claims. (Cl. 214—17)

This invention relates to fluid-solid contacting apparatus. In one of its more specific aspects it relates to improved means for distributing solid contact material in contact chambers. In another of its more specific aspects it relates to an improved method for distributing solid contact material in contact chambers.

When particulate solid contact material is poured onto a retarding or retaining surface, a pile of the solid contact material is formed as a cone, the dimensions of which are determined largely by the angle of repose of the particles. When the solid material comprises particles of a wide size range, the larger particles tend to roll down the upper surface of the conical pile to the bottom edge of the cone and the smaller particles come to rest at points near the apex or center of the cone. As a result of this fact, a segregation of the particles according to size is effected. When segregation of particles of solid contact material according to size takes place in catalyst chambers, dehydrating columns, adsorption towers, or pebble heater apparatus, such segregation results in the formation of zones of high resistance to gas or liquid flow where the smaller particles are concentrated and to zones of lower resistance where the larger particles predominate, and channeling of fluid through the solid contact material bed results. The resulting channeling or the non-uniform flow through the bed is reflected in the development of hot or cold spots, zones of high and low saturation, zones of carbon deposition and general loss of efficiency of heat transfer or conversion. This problem is particularly present when catalyst or adsorbent materials containing considerable quantities of fines are dumped or poured carelessly into a contact chamber.

Although the problems which arise by reason of non-uniform solid material distribution are particularly present when solid materials of various sizes are supplied to contact chambers, it is also quite important that even distribution of the solid contact material be made when the particles of solid contact material are of substantially uniform size. It is generally recognized that beds of solid particles may be of two different types. The first type is known as a random dense arrangement. Such a bed is formed by adding solid particles to the bed at a very slow rate, such that a particle which is added comes to rest on the bed before another is added in close proximity thereto. One advantage of that method of forming a solid material bed is that a minimum of bridging is encountered. Another advantage of a particle bed formed in this manner is its uniformity of resistance to the flow of fluid therethrough. The second type of solid contact material bed is known as a random loose arrangement. The method utilized in forming such a bed is simply that of simultaneously dumping all of the solid particles into position. This latter method has the advantage that it is very rapidly accomplished and the bulk density of the bed which is formed is considerably less than that of the random dense arrangement. Non-uniform fluid flow distribution or channeling results when both loose and dense arrangements are present in the same bed. Such a situation exists when the solid material bed is formed by pouring a solid contact material of a relatively wide particle size range into a contact chamber and raking the bed so as to level the top surface.

This invention comprises generally a method and apparatus for evenly distributing solid contact material which is supplied to a contact chamber, whether the contact material be of uniform or non-uniform size. This distribution is generally accomplished by dividing the solid material which is to be supplied to the contact chamber so that proportionate portions of contact material of the various sizes are supplied to selected points in the upper portion of the contact chamber. The contact material is released to freely fall from those selected points in the chamber and the fall of the material is checked by a plurality of screen members disposed in tiers intermediate the length of the fall.

An object of this invention is to provide an improved fluid-solid contact chamber. Another object of this invention is to provide a fluid-solid contact chamber designed to uniformly distribute solid contact material therein. Another object of the invention is to provide an improved method for packing fluid-solid contact chambers. Another object of the invention is to provide an improved method of distributing granular solids on a moving bed. Another object of the invention is to provide improved means for distributing solid material in fluid-solid contact chambers. Another object of the invention is to provide a method for laying down a bed of particulate solid material which will have a uniform resistance to fluid flow through its cross-section. Other objects and advantages will be apparent to those skilled in the art upon study of the accompanying disclosure.

Figure 2:
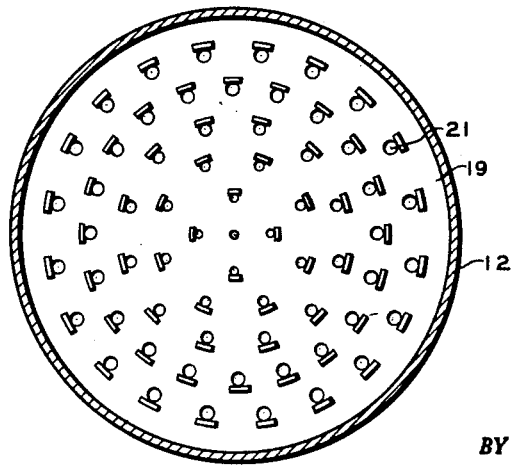
Figure 4:
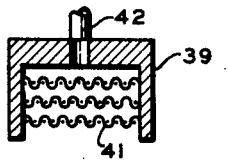
Figure 7:
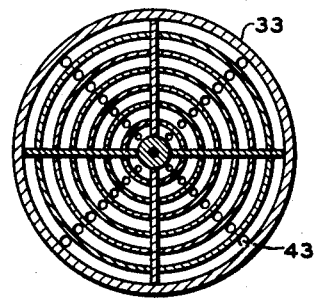
Figure 3:
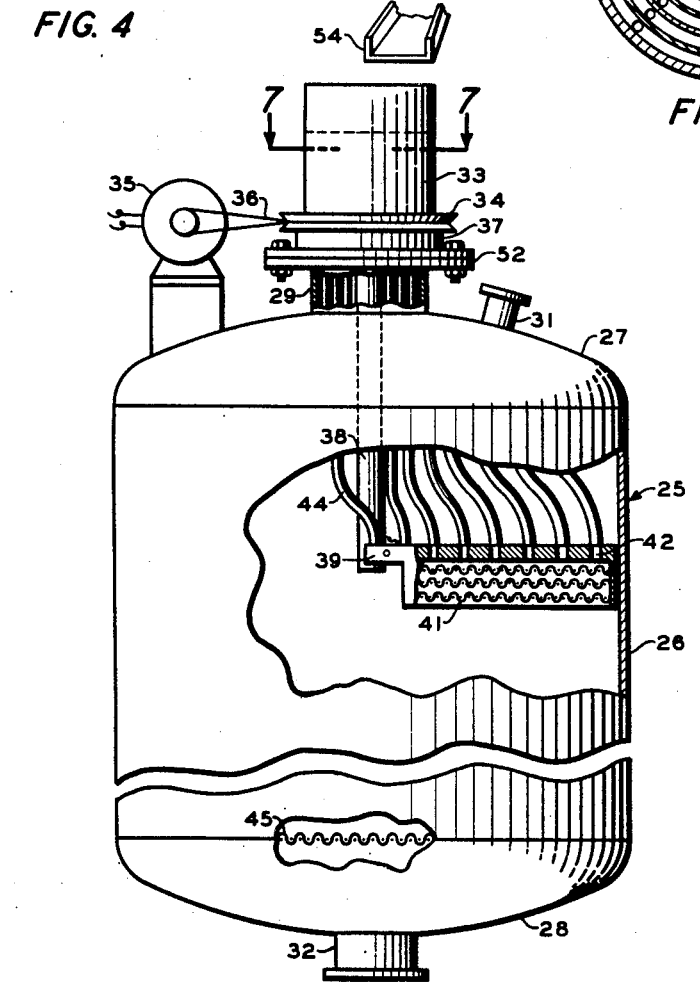

Understanding of the present invention will be facilitated upon reference to the drawings in which Figure 1 is an elevation partly in section of a fluid-solid contact chamber showing a solid material distribution means in the upper portion of the chamber and solid material flow checks in the lower portion of the chamber. Figure 2 is a plan view of the distributing cone shown in Figure 1. Figure 3 is an elevation, partly in section, of a fluid-solid contact chamber showing solid material distribution means in the upper portion of the chamber and solid material support means in the lower portion of the chamber. Figure 4 is a cross-section taken on line 4—4 of Figure 5. Figure 5 is a plan view of the support arm of the solid material distribution means of Figure 3, illustrating a system in which solid feed streams of graduated size directly proportional to the distance from the central axis are introduced at points equally spaced along the support arm. Figure 6 is a modification of the support arm of Figure 5, showing a modification of the spacing of solid material outlets of equal size by which solid feed streams of equal flow rate are introduced through outlets spaced at intervals which are inversely proportional to the distance from the central axis. Figure 7 is a plan view of a solid material collector of the solid material distribution means of Figure 3. Figure 8 is a modification of the solid material distribution means of Figure 3. Figure 9 is a detailed view of the solid material distribution means shown in Figure 3 of the drawings. Figure 10 is another modification of the solid material collection means of this invention.

Referring particularly to the device shown in Figure 1 of the drawings, fluid-solid contact chamber 11 comprises shell 12 which is closed at its upper and lower ends by closure members 13 and 14, respectively. Solid material inlet conduit 15 is provided in closure member 13 and fluid flow conduit 16 is provided in the upper portion of chamber 11. Conduits 16 may be positioned above or below the pebble distributing screens described below. Solid material conduit 17 and fluid flow conduit 18 are provided in closure member 14. Solid material distributing cone 19 is disposed in the upper portion of chamber 11 with its apex coaxially disposed with relation to solid material inlet conduit 15 and shell 12. Distributing cone 19 is provided with a plurality of solid material conduits 21 through its surface, conduits 21 being uniformly distributed over the conical surface. The perimeter of cone 19 terminates at the wall of shell 12. Disposed immediately below cone 19 are a plurality of solid material distribution screens 22 which may be bar grills which are disposed in tiers and are limited at their peripheries by the wall of shell 12. Screens 22 are horizontally positioned within chamber 11 and rigidity is at times added thereto by suspension from suspension members 23 which are affixed at their upper ends to cone 19. Flow control baffles 24 are provided in the lower portion of chamber 11.

In the operation of the device shown as Figure 1 of the drawings, which is particularly adapted to flowing bed type operation, solid contact material is supplied to chamber 11 through solid material inlet conduit 15. The stream of solid contact material is divided by the apex of distributor cone 19 and the solid material is caused to flow downwardly and outwardly over the surface of the perforate distributor cone 19. The feed of solid particles is such that the particles do not roll on another layer of particles on the baffles. The perforations 21 in cone 19 are disposed with such uniformity and are of such size as to evenly distribute solid contact particles over the entire cross-section of the contact chamber. The solid contact particles which fall through perforations 21 are checked during their fall by solid material distribution screens 22 and by the time the solid material has fallen through the plurality of screens, a uniform distribution of the solid particles, regardless of size, has been obtained. The solid particles are then allowed to fall freely onto the surface of the solid material bed, thus forming a random arrangement of the solid material. The solid material is built up to a level adjacent the lower distribution screen at which time the addition of solid contact particles through solid material inlet conduit 15 is regulated in accordance with the removal of solid contact particles through solid material outlet conduit 17. The flow of solid material from the lower portion of chamber 11 is retarded by baffle members 24 which aid in maintaining uniform flow throughout the cross-section of chamber 11. Perforations in baffle members 24 are staggered so that perforations of one baffle are over imperforate sections of another baffle. Gaseous or liquid contact materials may be added to chamber 11 through one or the other of fluid flow conduits 16 or 18. The materials resulting from the fluid-solid material contact within chamber 11 are then removed from the chamber through the other fluid flow conduit 16 or 18. Although chamber 11 is shown as having only one fluid outlet, it is within the scope of this disclosure that a plurality of outlets may be disposed along the length of the chamber if so desired.

Distributor cone 19 may be provided with lip projections extending upwardly along the lower side of each of the perforations 21 so as to cause the solid material to flow through the respective perforations and thus aid in the distribution of solid particles. Screen members 22 may be disposed so that the squares of one screen are oriented on a horizontal plane at an angle, e. g., 45° from the squares of the next preceding horizontal screen.

The chamber shown and described as Figure 1 of the drawings is ordinarily one which is of new construction. The distribution device shown in Figure 3 is intended for the filling of chambers having fixed granular beds. It may be inserted into the chamber through either a manhole or a centrally located fluid flow conduit in the top closure of the chamber. It is used only during the filling operation and is normally removed before the chamber is reconnected to the process system. Chamber 25 comprises shell 26 which is closed at its upper and lower ends by closure members 27 and 28, respectively. Manhole 29 and fluid flow conduit 31 are provided in closure member 27 and fluid flow conduit 32 is provided in closure member 28. Solid material collection means 33 is rotatably disposed on the upper side of a drive member 34. Drive member 34 may be a pulley or gear which will provide a traction surface for operative connection with drive means 35. Drive means 35 is a conventional motor which may be connected to drive member 34 by a belt member 36. Drive member 34 is preferably supported on a bearing race 37 which is more clearly shown in Figure 9 of the drawings. Support axle 38 extends vertically downward from drive member 34 and is pivotally connected to support arm 39 which is disposed at right angles to support axle 38. Distributor screens 41 are screen strips or bar grills which are retained on the lower side of support arm 39 and below solid material outlets 42 which extend through arm 39. Screens 41 are arranged in tiers and may be oriented as described in connection with the device shown in Figure 1 of the drawings.

Solid material collection means 33 is a plurality of concentric chambers of equal radial thickness. Outlets 43 from the individual chambers may be sized directly proportionate to the distance of the chamber section with which they communicate from the axis of the solid material collector. Solid material conduits 44 extend between outlets 43 and outlets 42. Outlets 42 are equally spaced along the length of support arm 39 and are sized with relation to holes 43 and tubes 44 so that the volume rate of flow is proportionate to the distance from the support axle. Outlets 43 are connected to corresponding outlets 42 by conduits 44 which are also of a corresponding size with the outlets which they connect. Solid material support member 45 which is a screen or grate is provided in the lower portion of chamber 25 and supports the solid particle bed so as to maintain a static solid material bed within the contact chamber. The chamber shown in Figure 3 is especially adapted for use as a fixed-bed chamber.

In the operation of the device shown as Figure 3 of the drawings, particulate solid contact material is supplied to solid material collector 33 by means of a vibratory feeder or the like and conduit 54. The flow of solid material is divided into proportional parts by collector means 33 and the particles flow downwardly through outlets 43 and conduits 44 through outlets 42. The particles pass through screen members 41 and drop freely onto the solid material bed as drive means 35 supplies rotating motion to drive member 34 which turns support arm 39 about chamber 25 at a constant rate of speed. The solid material bed is built up to a level adjacent the lower distribution screen. Support arm 39 extends from the axis of chamber 25 to the wall of shell 26 and the distribution of solid material over the bed within the chamber is uniform as to particle size and arrangement. When the chamber is packed, the distribution means is removed through conduit 29. The fluid which is to be contacted with the solid contact material in chamber 25 may be passed into that chamber through either of manhole 29 or conduits 31 or 32 and removed from the chamber through the fluid flow conduit on the opposite end of the solid material bed. Chamber 25 can be operated without the use or presence of conduit 31 by making use of manhole 29 as a conduit in the upper end of the chamber.

The distribution device of Figure 3 is more particularly shown in Figure 9. Support axle 38 extends downwardly through collector means 33 and drive member 34 and is affixed to drive member 34. Positioning rod 46 is slidably retained throughout most of the length of support axle 38 but is threadedly maintained in at least a portion of its length by support axle 34 as shown by threaded portion 47. The lower portion of positioning rod 46 is provided with a toothed section 48 which is meshed with gear segment 49 rigidly affixed to support arm 39 at its pivot point. Hinge member 51 is provided on support axle 38 and supports support arm 39 by a pivot therein. This distributing means is inserted into a centrally disposed manhole and affixed therein by cover plate 52 while support axle 38 and support arm 39 are parallel. Positioning arm 46 is then operated by drive member 53 which rotates gear segment 49 and causes support arm 39 to be raised to a position at right angles to support axle 38. Conduits 44 are flexible so as to allow the positioning of arm 39. Distributor screens 41 are positioned below outlet conduits 42 as described in connection with Figure 3. Although I have chosen to specifically show positioning arm 46 as being retained in position by threaded connection with support axle 38, it is within the scope of this disclosure that any other retainer means, such as a rachet and pawl may be used instead.

Figure 7 is a plan view taken on line 7—7 of Figure 3. The collector means 33 is divided into concentric chambers which are then quartered by partitions. The floor of the collector is sloped toward each outlet, thus facilitating removal of particles from the collector. Outlets 43 are directly proportional in size to their distance from the axis of the collector.

Collector means 33 may be modified in the manner shown in Figures 8 and 10 of the drawings. Collector means 33' of Figure 8 comprises a conduit which is divided by a plurality of bifurcations into a plurality of conduits which are of equal cross-section. Collector means 33'' of Figure 10 is in the form of a plurality of chambers of unequal volume. The modification which is utilized in connection with the distributor means will be dependent upon whether or not outlets 42 in suport arm 39 are equally spaced along the length of the support arm or whether or not they are spaced in accordance with their distance from support axle 38. As has been pointed out above, when outlets 42 are spaced equally along the length of support arm 39 the size of the outlet is so selected with relation to the dimensions of the tube 44 and the hole 43 that the rate of flow through the outlet 42 is directly proportionate to its distance from support axle 38. On the other hand, the feed may be delivered as a number of equal streams through a system of outlets 42 spaced apart by distances inversely proportional to the distance from support axle 38. The object in either case is to distribute the feed so that the level of the bed will rise evenly and no appreciable rolling of particles on top of the bed will occur. Other methods of splitting and evenly distributing the solid material feed may be used.

In the foregoing description of my invention, it is assumed that the solid material will be delivered in a stream of substantially uniform particle size distribution, i. e., unsegregated, to cone 19 of Figure 1, and to collect means 33 of Figure 3 and 54 of Figure 10. Devices for accomplishing such uniformly mixed feed are known. Rather wide variation of average particle size with the time can be tolerated if the various particle sizes are uniformly distributed over the cross-sectional area of the feed stream at every instant. By the present invention, the solid material is thereafter divided into a plurality of fractional feed streams of substantially the same particle size distribution and these fractional streams are introduced at points such that the level of the top of the bed rises uniformly to substantially eliminate rolling of particles on top of the bed. The fall of particles is interrupted by a series of checks to induce random distribution of particles and the flow is so restricted that particles fall freely from the last check to the top of the bed. In this manner a random dense packing is obtained.

Although the adjustable distributing means has been shown as being retained by a toothed positioning rod section meshed with a gear segment, it is within the scope of the disclosure that another type of positioning means may be pivotally attached to the upper surface of support arm 38 so that it can be hoisted into position and retained by a connection on support axle 38.

Various other modifications will be apparent to those skilled in the art upon study of the accompanying disclosure and the drawings. It is believed that such modifications are within the spirit and scope of this disclosure and invention.

I claim:

1. An improved upright fluid-solid contact chamber which comprises an outer shell closed at its upper and lower ends; a solid material inlet conduit centrally disposed in the top of said chamber; a fluid material conduit in the bottom end of said chamber; a plurality of solid material distribution screens spaced one above the other in the upper portion of said chamber; a solid material distribution means above said screens, said distribution means communicating between a solid material supply source and selected points above the uppermost said screen; and a fluid material conduit in the upper end of said chamber.

2. An improved upright fluid solid contact chamber which comprises an outer shell closed at its upper and lower ends; a solid material inlet conduit disposed in the top of said chamber; a fluid material conduit in the bottom end of said chamber; solid material support means in the bottom portion of said chamber; a plurality of solid material distribution screens spaced one above the other in the upper portion of said chamber; a solid material distribution means above said screens, said distribution means communicating between a solid material supply source and selected points above the uppermost said screen; and a fluid material conduit in the upper end of said chamber.

3. The improved chamber of claim 1, wherein said solid material distribution screens are substantially horizontally positioned and disposed in tiers in the upper portion of said chamber, said screens being limited at their periphery by said chamber walls; a solid material distributor above said screens, said distributor comprising a perforate cone limited at its periphery by the walls of said chamber above said screens and being positioned coaxially in relation to said solid material inlet, the perforations in said cone being sized so as to allow the passage of solid materials therethrough.

4. A solid material distribution means comprising a solid material collection means; a support axle; a support arm attached to the lower end of said axle, pivotal to parallel and at right angle positions thereto; and solid material conduits extending from said solid material collection means to outlets spaced apart along the length of said arm; and solid material distribution screen strips disposed in tiers and mounted on said support arm below said outlets on said arm.

5. The solid material distribution means of claim 4, wherein said solid material collection means comprises a plurality of solid material chambers of progressively greater volume; and said solid material conduits extend between said solid material chambers and said outlets on said support arm, the conduit extending from the chamber of greatest volume having the largest cross-section and being connected to the outlet nearest the end of the support arm opposite said axle and the conduit extending from the chamber of least volume having the smallest cross-section and being connected to the outlet nearest said axle.

6. The solid material distribution means of claim 5, wherein said solid material collection means comprises an upright solid material conduit formed as a plurality of concentric chambers of equal radial thickness; and said solid material conduits connecting said concentric chambers with corresponding outlets on said supply arm.

7. The solid material distribution means of claim 4, wherein said solid material collection means comprises an upright solid material conduit divided into a plurality of conduits by a plurality of bifurcations in its lower end portion; and said solid material conduits extend between said bifurcated solid material conduit and said outlets on said support arm.

8. The solid material distribution means of claim 7, wherein the final solid material conduits resulting from the plurality of bifurcations are of equal cross-section; and said outlets on said support arm are spaced apart along the length of said arm inversely to their distance from said support axle.

9. The solid material distribution means of claim 4, wherein said solid material collection means comprises an upright solid material conduit divided into a plurality of conduits of unequal cross-section by a plurality of bifurcations in its lower end portion; said outlets on said support arm are equally spaced along the length of said arm and the cross-section of said outlets varies directly with their distance from said axle.

10. The solid material distribution means of claim 4, wherein a drive member is rigidly affixed to the upper end portion of said support axle; a bearing member rotatably affixed to the lower side of said drive member; a positioning rod threadedly secured in said support axle and extending downwardly through the length of said axle, said positioning rod having a toothed portion at its lower end; a gear segment rigidly mounted on one end of said support arm and meshed with said toothed portion of said positioning rod; and a drive member affixed to the upper end of said positioning rod.

11. The improved pebble chamber of claim 2, wherein a bearing member is rigidly affixed to said chamber so as to close said solid material inlet conduit; a support axle rotatably supported by said bearing member; a first drive member affixed to the upper end portion of said support axle; drive means operatively connected to said drive member; a support arm pivotally connected to the lower end portion of said support axle and extending at right angles to said support axle; a gear segment rigidly affixed to the pivoted end of said support arm; a positioning rod fixably maintained in and extending downwardly through said support axle, said positioning rod having a toothed portion in its lower end meshed with said gear segment; a second drive member affixed to the upper end of said positioning rod; solid material outlets spaced along the length of said support arm; solid material collection means mounted on said first drive means; solid material conduits extending from said solid material collection means to said outlets in said support arm; and said distribution screens being strips disposed in tiers and mounted on said support arm below said outlets in said arm.

12. The method of forming a bed of solid contact material in a contact chamber which comprises dividing said contact material into a plurality of representative streams; progressively rotating said streams of contact material about said chamber on annuli spaced from the longitudinal axis of said chamber; dropping said plurality of representative streams of said solid contact material onto and through a plurality of vertically spaced apart distribution screens in the upper portions of said chamber without separation of said contact material according to size, thereby causing free fall of said solid contact material from each of said screens; and forming a bed of said contact material, uniformly and randomly distributed throughout its depth.

ROBERT D. SNOW.

References Cited in the file of this patent

UNITED STATES PATENTS

| Number | Name | Date |
| --- | --- | --- |
| 2,491,446 | Hagenbaumer | Dec. 13, 1949 |

FOREIGN PATENTS

| Number | Country | Date |
| --- | --- | --- |
| 165,160 | Germany | Nov. 11, 1905 |
| 714,221 | France | Sept. 1, 1931 |